(12) United States Patent
Morooka

(10) Patent No.: US 11,622,049 B2
(45) Date of Patent: Apr. 4, 2023

(54) CALLING A NATIVE LIBRARY BY USING A SCRIPT CONTAINED IN WEB CONTENTS

(71) Applicant: CANON KABUSHIKI KAISHA, Tokyo (JP)

(72) Inventor: Hidekazu Morooka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/387,460

(22) Filed: Jul. 28, 2021

(65) Prior Publication Data

US 2022/0038585 A1 Feb. 3, 2022

(30) Foreign Application Priority Data

Jul. 30, 2020 (JP) .............................. JP2020-129210

(51) Int. Cl.
*H04N 1/00* (2006.01)
*G06F 9/54* (2006.01)

(52) U.S. Cl.
CPC ......... *H04N 1/00222* (2013.01); *G06F 9/547* (2013.01); *H04N 1/0044* (2013.01); *H04N 1/00464* (2013.01); *H04N 1/00474* (2013.01)

(58) Field of Classification Search
None
See application file for complete search history.

(56) References Cited

U.S. PATENT DOCUMENTS

| 10,067,807 | B2 * | 9/2018 | Ito ........................... G06F 9/468 |
| 2009/0129680 | A1 * | 5/2009 | Nozaki ................. G06F 40/186 382/195 |
| 2017/0147414 | A1 * | 5/2017 | Ito ........................... G06F 9/541 |

FOREIGN PATENT DOCUMENTS

JP 2016143416 A 8/2016

* cited by examiner

*Primary Examiner* — Dov Popovici
(74) *Attorney, Agent, or Firm* — Canon U.S.A., Inc. IP Division

(57) ABSTRACT

According to an aspect of some embodiments, an information processing apparatus is configured to perform: displaying an operation screen in a display, the operation screen generated by instructing a WebView to process the obtained web contents; if a predetermined instruction is given through the operation screen, calling the native library by using a script contained in the web contents, and instructing the called native library to generate image data corresponding to the file; and displaying the image data generated by the native library in the operation screen.

8 Claims, 16 Drawing Sheets

FIG. 4

```
1    Public class WebApp{
2            public void getImage(string param){
3                    :
4                    :
5            }
6
7            public void cb_getImage(string param ){
8                    :
9                    :
10           }
11   }
12
13   webView.addJavascriptInterface(new WebApp(), "nativeApp ");
```

FIG. 5

```
1    <button type="button" id="btn_id_getImage">PREVIEW</button>
2    :
3    :
4    :
5    <script type="text/javascript">
6        document.getElementById('btn_id_getImage').addEventListenter('click',
7        function () {
8            nativeApp.getImage({callback: 'cb_getImage', filepath: filepath]);
9
10       }, false);
11   </script>
```

FIG. 6

```
1    webview.evaluateJavascript(new String(cb_getImage(jres.toString())),
2    new ValueCallback<String>() {
3            @Override
4            public void onReceiveValue(String value) {
5                    :
6            }
7    });
```

FIG. 7

```
1     <p class="text-center" id="p_img">
2         <img id="pic" />
3     </p>
4
5
6     <script type="text/javascript">
7         cb_getImage = function (json) {
8             :
9             :
10            window.localStorage["picCache"] = json.imgdata64;
11            document.getElementById("pic").src = window.localStorage["picCache"];
12         }
13    </script>
```

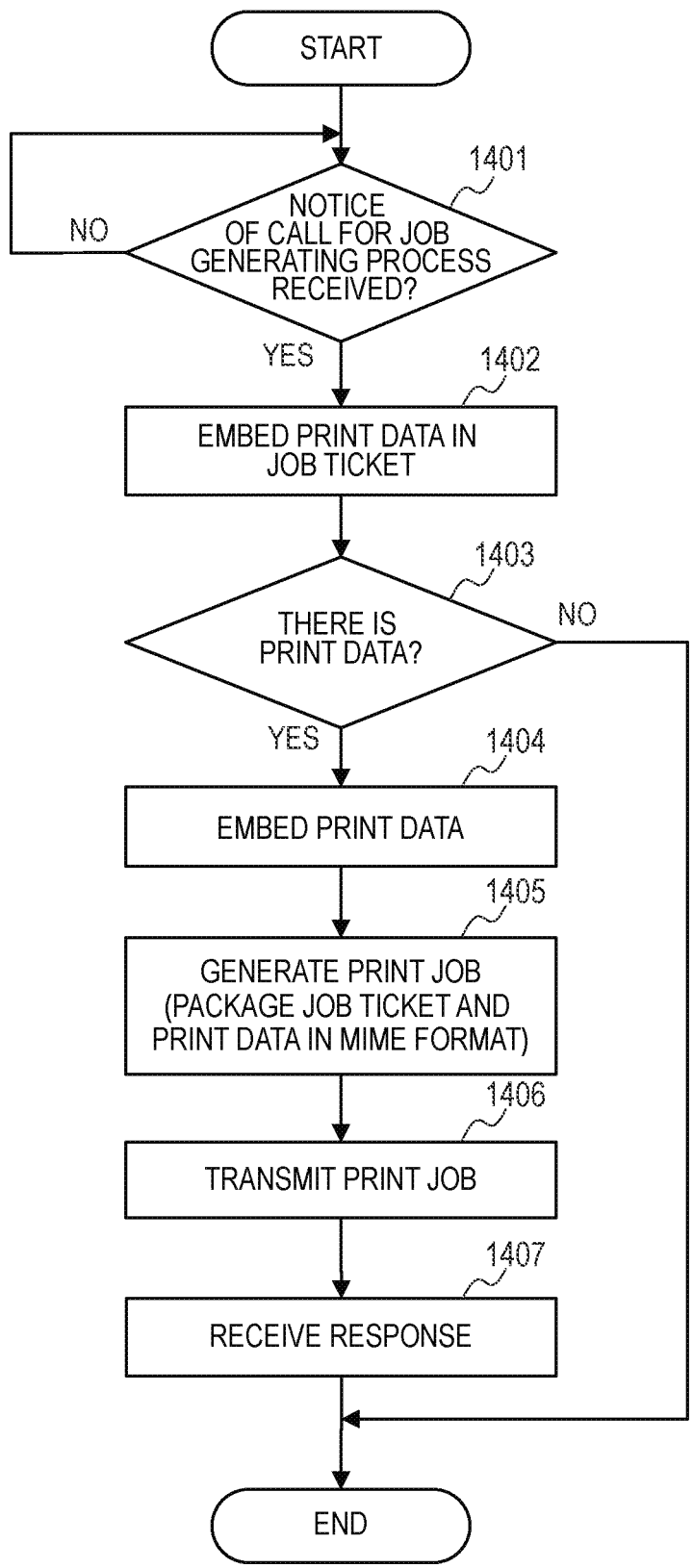

FIG. 15

```xml
<?xml version="1.0" encoding="utf-8"?>
<JDF ID="J1" JobPartID="ID0" Type="Combined" Activation="Active" Status="Ready" Version="1.2" Category="DigitalPrinting" ICSVersions="IDP_L1-1.0 Base_L1-1.0" MaxVersion="1.2" JobID="ID1" Types="LayoutPreparation Imposition Interpreting DigitalPrinting" xmlns="http://www.CIP4.org/JDFSchema_1_1">
  <ResourcePool>
    <RunList Class="Parameter" ID="IDRL" Status="Available" PartIDKeys="Run">
      <RunList Run="0">
        <LayoutElement>
          <FileSpec MimeType="application/pdf" URL="cid:PRINT DATA NAME.pdf" />
        </LayoutElement>
      </RunList>
    </RunList>
    <LayoutPreparationParams Class="Parameter" ID="IDLPP" Status="Available" Sides="OneSidedFront" />
    <ColorantControl Class="Parameter" ID="IDCC" Status="Available" ProcessColorModel="DeviceCMYK" />
    <DigitalPrintingParams Class="Parameter" ID="IDDPP" Status="Available" Collate="SheetSetAndJob">
      <MediaRef rRef="IDM" />
    </DigitalPrintingParams>
    <Component Class="Quantity" ID="IDC" ComponentType="FinalProduct" Status="Unavailable" />
    <Media ID="IDM" Class="Consumable" Status="Available" Dimension="595.0 842.0" />
  </ResourcePool>
  <ResourceLinkPool>
    <RunListLink rRef="IDRL" Usage="Input" CombinedProcessIndex="0" />
    <LayoutPreparationParamsLink rRef="IDLPP" Usage="Input" CombinedProcessIndex="0" />
    <ColorantControlLink rRef="IDCC" Usage="Input" CombinedProcessIndex="2" />
    <DigitalPrintingParamsLink rRef="IDDPP" Usage="Input" CombinedProcessIndex="3" />
    <MediaLink rRef="IDM" Usage="Input" CombinedProcessIndex="3" />
    <ComponentLink rRef="IDC" Usage="Output" Amount="1" CombinedProcessIndex="3" />
  </ResourceLinkPool>
</JDF>
```

FIG. 16

| EXTENSION | FILE TYPE |
|---|---|
| jpg , jpeg | image / jpg |
| bmp | image / bmp |
| pdf | application / pdf |

CALLING A NATIVE LIBRARY BY USING A SCRIPT CONTAINED IN WEB CONTENTS

BACKGROUND

Field of the Disclosure

The present disclosure relates to an information processing apparatus configured to display an operation screen provided from a Web server, a method of controlling the information processing apparatus, and a non-transitory storage medium.

Description of the Related Art

Some systems are known to comprise an information processing device such as a personal computer (PC) or a mobile phone connected to a Web server over a network, the information processing device configured to display an operation screen provided by a Web application on the Web server. In such systems, a Web browser of the information processing device first sends a request for an operation screen to a Web application on the Web server. In response to the request from the information processing device, the Web application sends HTML data to allow the Web browser to display the operation screen. The Web browser analyses the received HTML data, and displays the operation screen based on descriptions of the HTML data. If a user inputs an instruction through the operation screen displayed in the Web browser, the Web browser notifies the Web server of the input instruction. In response to receiving the notification, the Web application executes processing in accordance with the notification.

There is a component called "WebView" having functions similar to the Web browser, and usable as a GUI element constituting an application on the information processing device. The usage of WebView allows the application on the information processing device to provide functions and expressions similar to the Web browser. WebView is included in the information processing devices such as a mobile phone or a smartphone.

WebView may comprise a binding mechanism to directly call a native library function of the information processing device from JavaScript executed in the Web application. The native library function is a function provided by an operating system (OS) of the information processing device or a language processing system.

Japanese Patent Application Laid-Open No. 2016-143416 proposes a technique of displaying an operation screen of a game application by using WebView.

Displaying an operation screen of applications by using WebView allows to update the application only by rewriting an HTML code. In this type of application installed in the information processing device, image data based on a file stored in the information processing device may be wished to be displayed using WebView. For example, a preview of file stored in a local device (i.e., client side) may be wished to be displayed using WebView before printing.

The conventional techniques are unable to generate image data (e.g., preview images) based on a file stored in the client side, and then display the generated image data in the operation screen, because this type of application uses WebView for displaying an operation screen. In this regard, it is possible to ask a server to generate a preview image, and then display the preview image generated by the server. However, this configuration includes transmission/reception of image data through a network, which could be influenced by traffic conditions of network environment and cause a delay of display processing.

SUMMARY

According to an aspect of the present disclosure, an information processing apparatus comprises: at least one memory that stores instructions, a native library, and a file; and at least one processor that executes the instructions to perform: obtaining web contents from a server; displaying an operation screen in a display, the operation screen generated by instructing a WebView to process the obtained web contents; if a predetermined instruction is given through the operation screen, calling the native library by using a script contained in the web contents, and instructing the called native library to generate image data corresponding to the file; and displaying the image data generated by the native library in the operation screen.

Further features of the present disclosure will become apparent from the following description of exemplary embodiments with reference to the attached drawings.

BRIEF DESCRIPTION OF THE DRAWINGS

FIG. 4 is a diagram showing an example of Java code for the native library bound to an application through a JavaScript core.

FIG. 5 shows an example of HTML and JavaScript codes included in Web contents.

FIG. 6 shows an example of Java class bound to JavaScript.

FIG. 7 shows an example of HTML and JavaScript codes called from Java of the native library.

FIG. 14 is a flowchart showing specific processes for transmitting a job.

FIG. 15 shows an example of job ticket.

FIG. 16 shows an example of data for determining file types.

DESCRIPTION OF THE EMBODIMENTS

Figure 1:
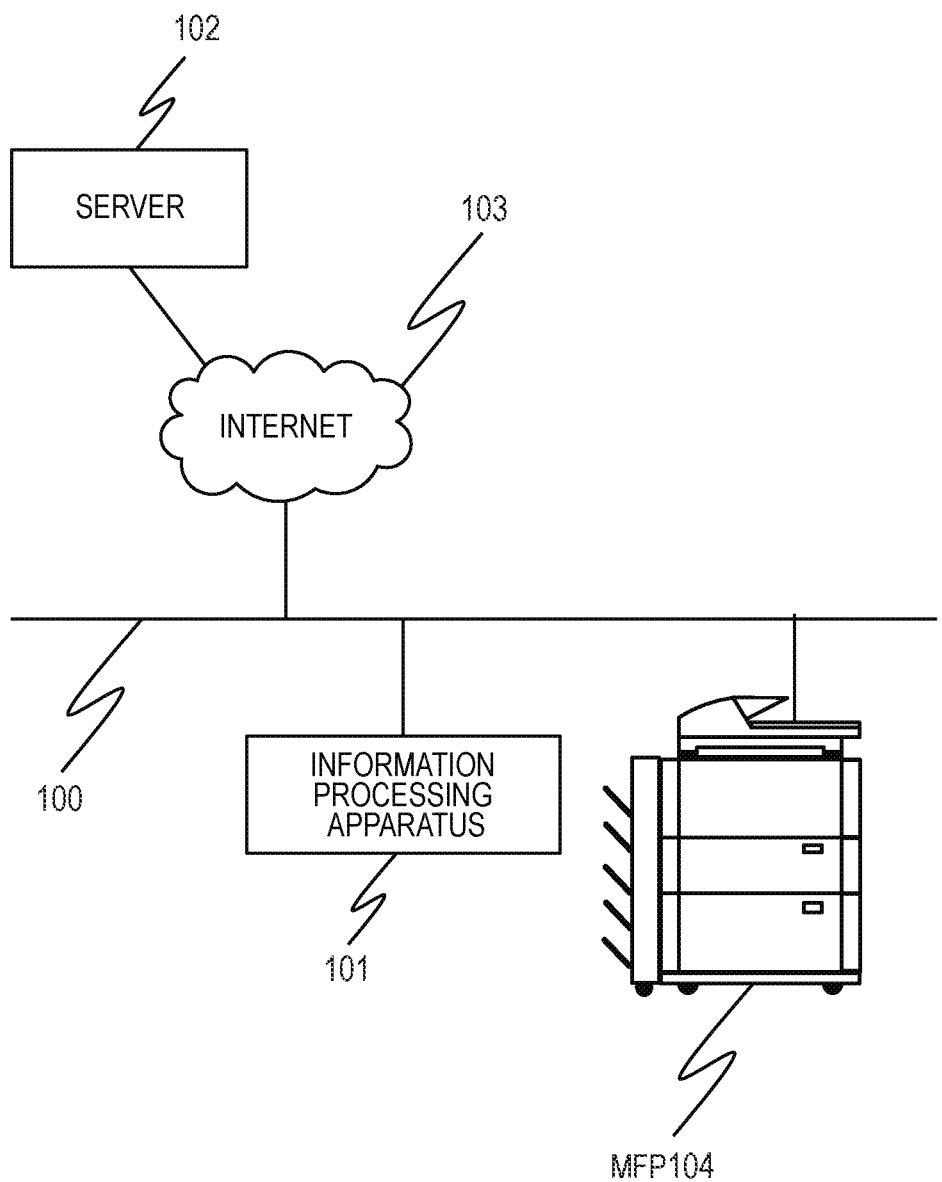
FIG. 1 is a diagram showing a system to which the information processing apparatus according to the present disclosure is applicable.

FIG. 1 shows a diagram showing a system to which the information processing apparatus according to the present disclosure is applicable.

The present system includes an information processing apparatus 101 connected to the internet 103 through a network 100 such as a local area network (LAN), a server 102 connected to the internet 103, and an MFP (Multi-Function Printer) 104.

The network 100 is a foundation for performing communications between each device, and connected to the internet 103. The information processing apparatus 101 may be any device comprising a Web browser and WebView function such as a mobile phone, a smartphone, or a personal computer (PC).

The server 102 has a function of distributing Web contents through a network. In response to a request from the information processing apparatus 101, the server 102 sends Web contents. The Web contents includes an HTML code containing a JavaScript code executed in the information processing apparatus 101.

The MFP 104 is a multi-function printer. However, the MFP 104 is not limited to a multi-function printer, and may be any device that can hold a print job such as a server.

Figure 2:
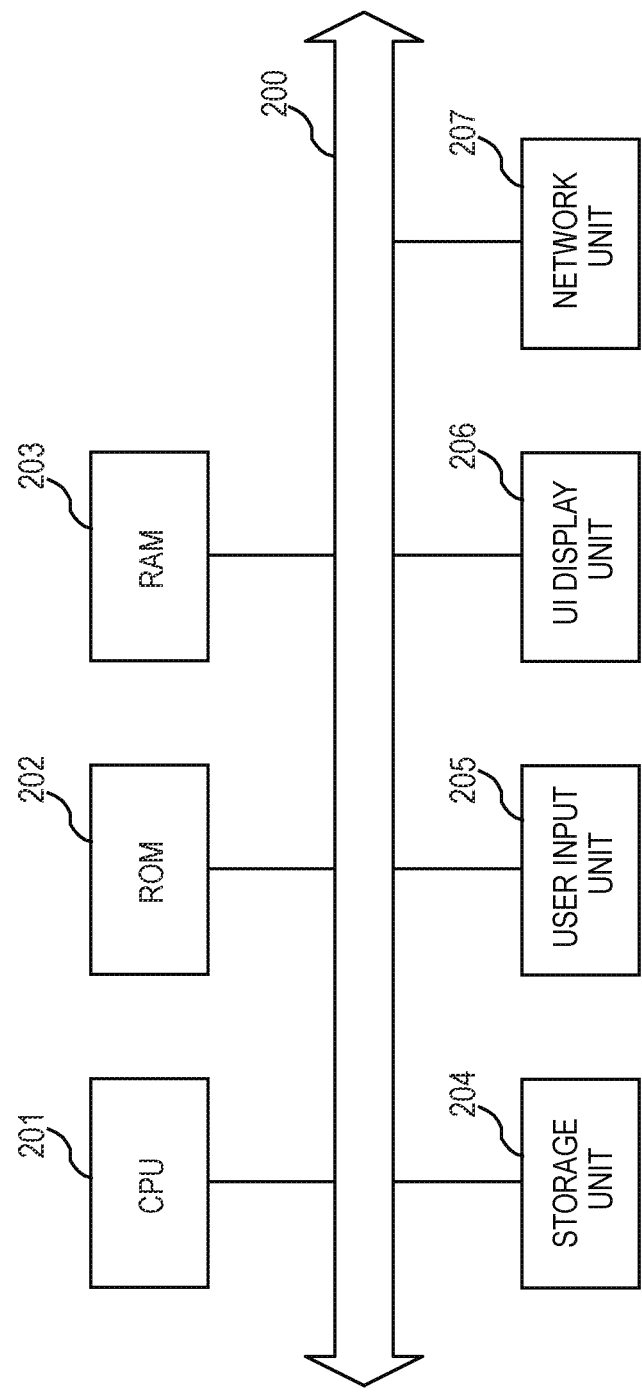
FIG. 2 is a block diagram showing a configuration of the information processing apparatus, server, and MFP (Multi-Function Printer) according to the present disclosure.

FIG. 2 shows an exemplary configuration of the information processing apparatus 101, the server 102, and MFP 104 according to the present disclosure. The MFP 104 further includes other configuration elements such as an image reading unit or a print unit, but they are not shown in FIG. 2.

The information processing apparatus 101 is specifically described below, but the server 102 and the MFP 104 have the configuration similar to the information processing apparatus 101. The information processing apparatus 101 comprises a CPU 201 configured to execute programs including an operating system (OS), applications, scripts other than the program according to the present disclosure.

The information processing apparatus 101 further comprises paper a ROM 202 configured to store data and programs executed by the CPU 201, and a RAM 203 configured to provide a work area where the data and the programs executed by the CPU 201 are expanded. The information processing apparatus 101 further comprises a storage unit 204 (e.g., a hard disk drive (HDD), a solid state drive (SSD), non-volatile RAM (NVRAM)) configured to store various settings and the program according to the present disclosure.

The information processing apparatus 101 further comprises a user input unit 205 for a user inputting commands, a user interface (UI) display unit 206 configured to display a screen such as a user interface screen, and a network unit 207 configured to perform communications with other devices through a network. The information processing apparatus 101 also comprises a main bus 200 configured to connect each configuration element.

In principle, the CPU 201 controls the ROM 202, RAM 203, the storage unit 204, the user input unit 205, the UI display unit 206, and the network unit 207 through the main bus 200 in each of the information processing apparatus 101, the server 102, and the MFP 104. In addition, the UI display unit 206 may include the function of the user input unit 205 such as a touch panel display. The image reading unit and the image printing unit of the MFP 104 may be also connected to the main bus 200.

Figure 3:
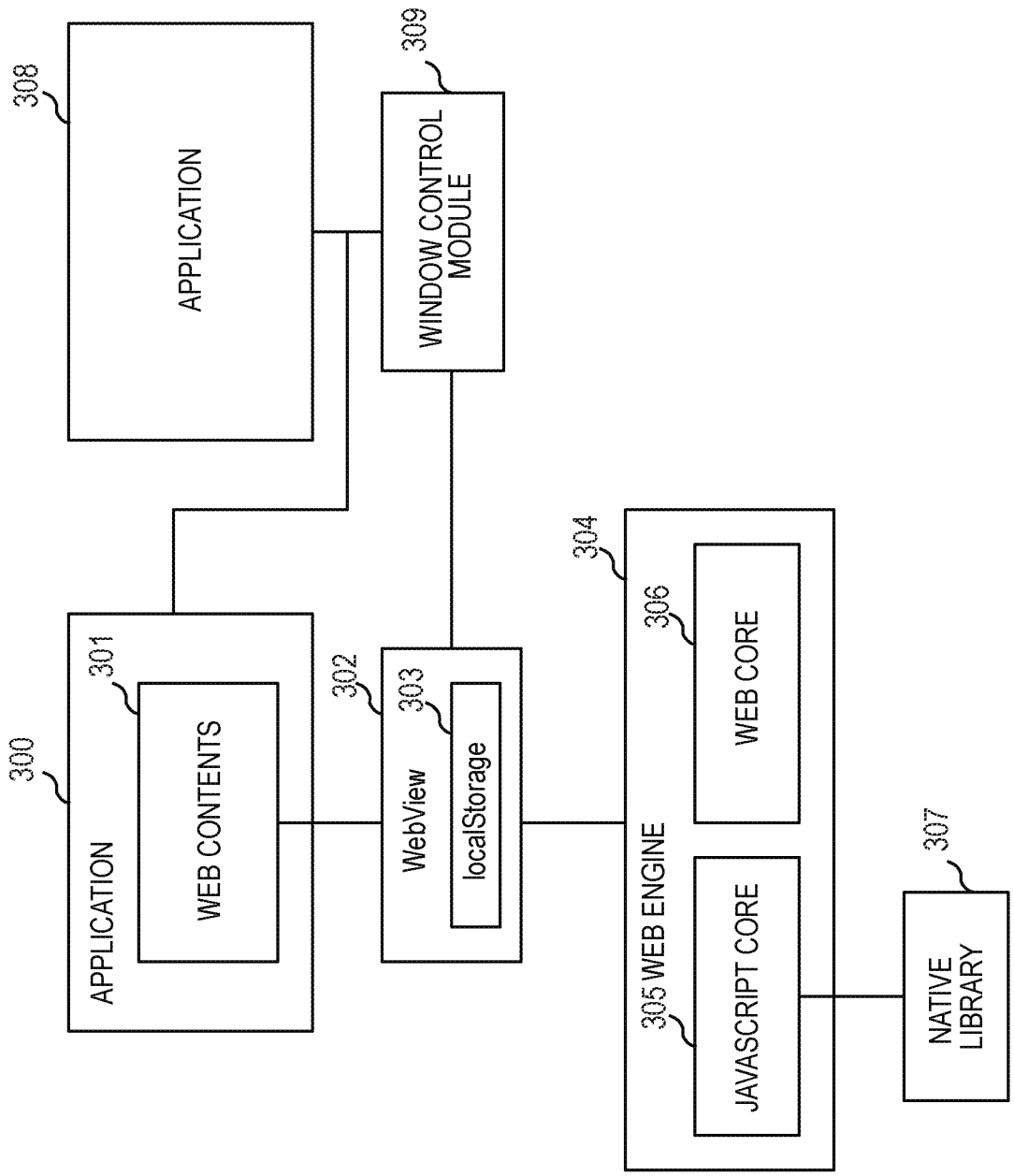
FIG. 3 is a diagram showing a configuration of software installed in the information processing apparatus according to the present disclosure.

FIG. 3 is a diagram showing a configuration of software installed in the information processing apparatus 101 according to the present disclosure. Each functional unit shown in FIG. 3 can be realized by the CPU 201 of the information processing apparatus 101 through the execution of a program.

Various types of applications are installed in the information processing apparatus 101. The first one is an application 300 that is configured to obtain Web contents from the server 102, bind a script included in the Web contents to a native function of the information processing apparatus 101. The second one is an application 308 that does not use any Web contents.

The application 300 obtains Web contents 301 from the server 102 through the network unit 207 that is a module for performing communications in accordance with the HTTP protocol. The obtained Web contents 301 are displayed by the application 300 using a WebView 302.

The WebView 302 is an application component usable in the information processing apparatus 101 such as an Android (registered trademark) or iOS (registered trademark) terminal. The WebView 302 provides, for the application 300 under execution, a function of displaying an operation screen based on Web contents obtained from the server 102 via a network (Web display function). The WebView 302 allows the information processing apparatus 101 to display an operation screen using Web contents and receive an operation from a user. For example, the WebView 302 can execute device functions (not shown) of the information processing apparatus 101 based on an input operation (e.g., selection of file) from a user via the operation screen. This can be realized by using a library (native library 307) of the device functions from a script through a binding function as described later.

The WebView 302 performs a rendering of the Web contents 301 by using a Web engine 304, and displays the result. The Web engine 304 comprises a Web core 306 and JavaScript core 305 as configuration elements.

The Web core 306 performs a rendering of an HTML code included in the Web contents 301. The JavaScript core 305 interprets and executes a JavaScript code included in the HTML code. The JavaScript core 305 has a function of interpreting the JavaScript code and executes the native library 307. The term "native library" indicates any one of a function provided by an operating system of an information processing apparatus, a shared library implemented by using a language processing system (e.g., Java or C programming language) and installed in the information processing apparatus, and a program made of a combination of these functions (details described later). The JavaScript core 305 has the binding function for binding the JavaScript code to the native library (e.g., class of Java) in accordance with an instruction from the application 300.

A window control module 309 manages and controls a display state of the operation screen of each application 300, 308. The information processing apparatus 101 has a platform including an engine (not shown) for executing an application implemented by using Java. The Web View 302, the Web engine 304, and the native library 307 of the configuration elements shown in FIG. 3 are included in the platform. If the application 300 is implemented by using Java, the information processing apparatus 101 can execute the application 300 via the platform. The executed application 300 can display Web contents by using the WebView 302, and can also use a Java object through a JavaScript code included in the Web contents.

A code for calling a Java method bound to HTML data via a JavaScript code is described below with reference to FIG. 4 and FIG. 5.

FIG. 4 shows an example of Java code for the native library 307 bound to the application 300 through the JavaScript core 305. In FIG. 4, the numbers put on the left side indicate the line numbers of the code.

A block shown from the first to eleventh lines defines an object class usable by the application 300 through a JavaScript code. In this example, the block defines a "getImage" method (from the second to fifth lines) in a WebApp class and a "cb_getImage" method (from the seventh to tenth lines) for a callback function (details described later).

The thirteenth line shown in FIG. 4 calls an "addJavascriptInterface" method for a WebView class to generate a Java object for allowing JavaScript and Java to communicate with each other. Executing the code shown in FIG. 4 allows JavaScript to call a method corresponding to a "nativeApp" object, and to execute a Java method named "WebApp.getImage".

FIG. 5 shows an example of HTML and JavaScript codes included in the Web contents 301. In FIG. 5, the numbers put on the left side indicate the line numbers of the code.

The first line shown in FIG. 5 is a code for generating a button to call JavaScript, which is written in HTML. More specifically, a "preview" button is displayed on a Web screen, and the block shown in the fifth to eleventh lines and defined as "btn_id getImage" is executed if the button is pressed down.

The eighth line shown in FIG. 5 defines a Java method called by a JavaScript code that is executed if the "preview" button is pressed down. In FIG. 5, the JavaScript code calls the "getImage" method in the "WebApp" class defined in FIG. 4 as a class of Java readable by the JavaScript core 305. The code shown in FIG. 5 sets a name of a callback function and a file path (of the original image for generating a preview image) as parameters for the "getImage" method. The name of callback function indicates a callback method, and the callback method is a method called for sending a result after completing the process of the method (e.g., the "getImage" in the block shown in the second to fifth lines of FIG. 4). As shown in FIG. 4, a name "nativeApp" is set for the newly generated object. In FIG. 5, a "nativeApp.getImage" is executed based on the name "nativeApp" set by the "webView.addJavascriptInterface" method shown in FIG. 4 to call a Java class. In such a way, the JavaScript core 305 can call and execute the method of a Java class bound to JavaScript as shown in FIG. 4 when executing the JavaScript code. As described above, the "cb_getImage" method for sending a result after completing the process of the "getImage" method is called by calling the "getImage" method with the callback function name "cb_getImage" as a parameter.

A code for putting a processing result from a Java class bound to JavaScript to HTML via JavaScript is described below with reference to FIG. 6 and FIG. 7.

FIG. 6 shows an example of Java class bound to JavaScript, which is executed by calling the "cb_getImage" method.

The first line shown in FIG. 6 calls an "evaluateJavascript" method for the WebView class to call a method included in the JavaScript code from a Java method. The "cb_getImage" method included in the first line is a callback function described in FIG. 5, which is defined in the WebApp class of FIG. 4. That is, the "cb_getImage" of JavaScript is called after completing the process of the "getImage" method of Java. During the above process, preview image data converted into a string representation is transferred.

FIG. 7 shows an example of HTML and JavaScript codes called from Java of the native library 307, which is also included in the Web contents 301 as well as the example shown in FIG. 5.

The JavaScript process written in the seventh line of FIG. 7 is called if the "cb_getImage" is executed by the "evaluateJavascript" method of WebView class shown in FIG. 6. The preview image data is stored in a "json" as a parameter in form of the string representation. According to the present embodiment, this preview image data can be called through a "json.imgdata64". The tenth line of FIG. 7 stores this preview image in a local storage (window.localStorage) 303 on the WebView 302. Displaying this preview image requires that the image data is set in a "src" of an "img" tag in the HTML code. The eleventh line of FIG. 7 in JavaScript sets the image data (json.imgdata64) in the "src" of the "img" tag, which causes the preview image to be displayed in a HTML portion of the WebView 302 (i.e., a position defined in the second line of FIG. 7).

Figure 8:
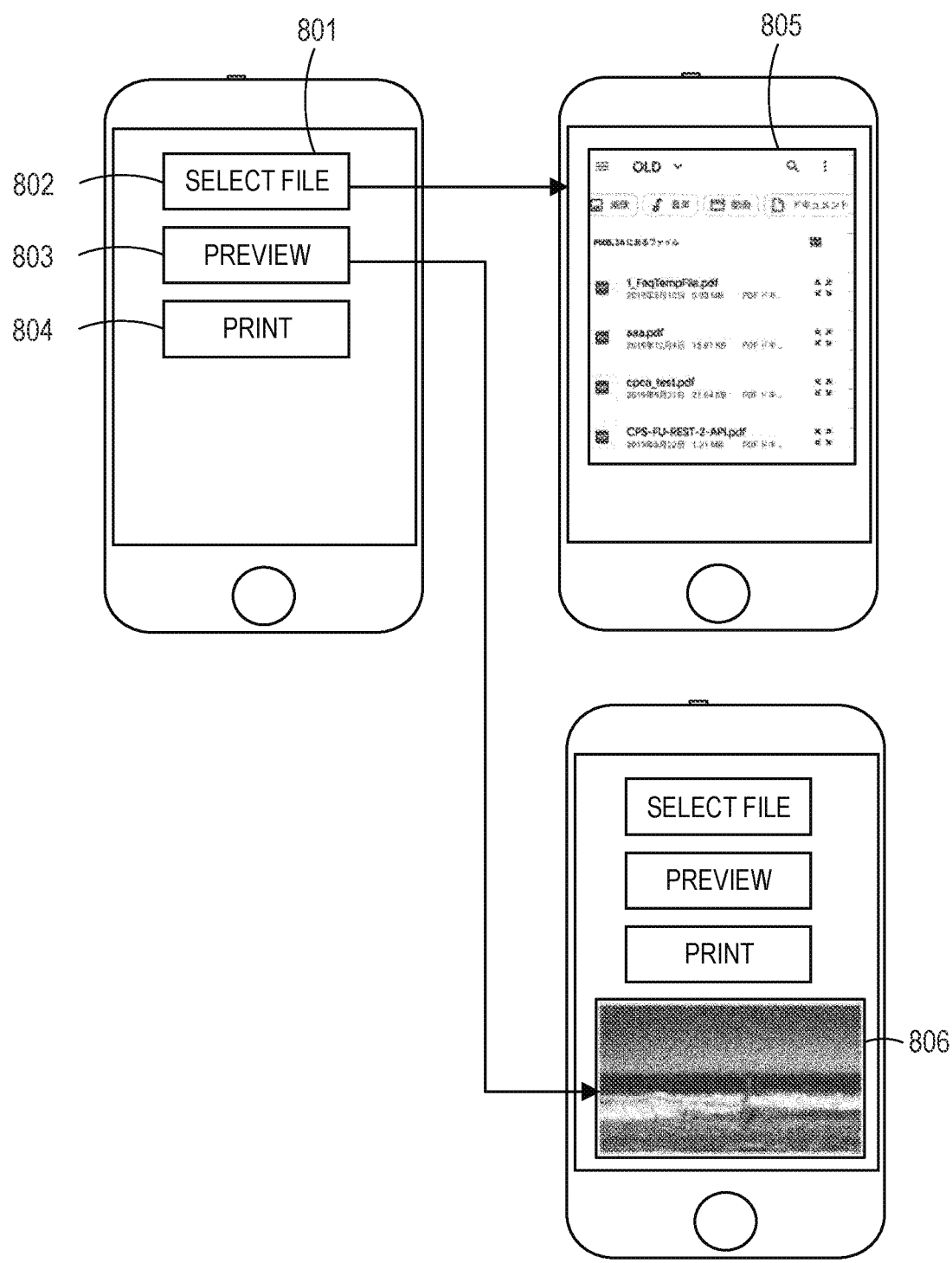
FIG. 8 shows a transition of the operation screen displayed in the information processing apparatus according to the present disclosure.

FIG. 8 shows a transition of the operation screen displayed in the information processing apparatus 101 according to the present disclosure. An operation screen 801 is displayed by the WebView 302. A "select file" button 802 is displayed based on a HTML code (not shown) included in the Web contents 301. If the "select file" button 802 is pressed, a Java method bound to JavaScript is executed, and the display turns to a file selection screen 805.

The file selection screen 805 allows a user to select a file such as a file stored in a local folder of the information processing apparatus 101, or a file stored in an external Web server (not shown). The display turns back to the operation screen 801 after selecting a file.

A "preview" button 803 is displayed based on the HTML code shown in FIG. 5. If the "preview" button 803 is pressed, information of the file selected through the file selection screen 805 is sent to the "getImage" bound to JavaScript shown in FIG. 4 and FIG. 5, and preview image data is generated. The generation of the preview image data is notified to JavaScript by the "cb_getImage". Then, the image data is set to the "img" tag of HTML, and a preview image is displayed in a region 806 of the operation screen 801. It is determined that, even if the file selected through the selection screen 805 consists of multiple pages, the preview image displayed in the region 806 is one the multiple pages.

Figure 9:
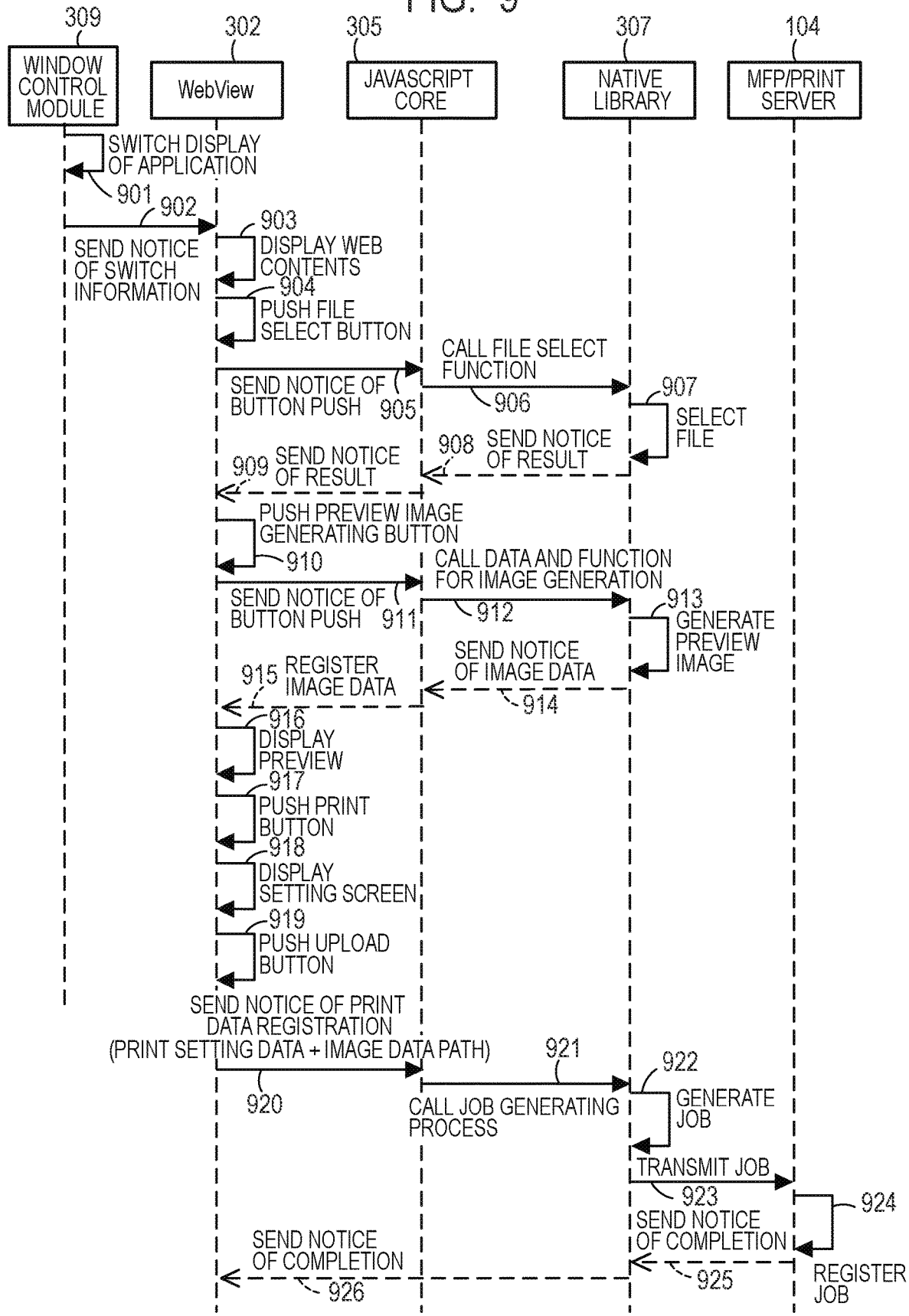
FIG. 9 is a sequence diagram showing a process flow from file selection to print job upload through display of preview image.

FIG. 9 is a sequence diagram showing a process flow from the file selection to print job upload through display of the preview image. The WebView 302 detects that the application 300 is in a state of displaying an image. The WebView 302 then displays a preview image by using the native library 307 bound to the application 300 via the JavaScript core 305. The process flow also includes uploading the displayed image data as a print job.

In step 901, the window control module 309 detects that the application 300 is selected and activated. The information processing apparatus 101 switches between applications by using the UI display unit 206 based on input information obtained by a user's operation through the user input unit 205. More specifically, if multiple applications are under execution, one of the applications selected through the user's operation is activated and displayed on the screen, and the other applications are not displayed on the screen. The window control module 309 monitors information indicative of a display state of the applications, and accesses the information to obtain the display state. The window control module 309 detects any change in the display state based on the information. If the window control module 309 detects that the information processing apparatus 101 switches the display on the screen to the application 300, the window control module 309 notifies the WebView 302 of the detection in step 902.

In step 903, the WebView 302 displays the Web contents 301 of the application 300. The WebView 302 provides the Web engine 304 with information of the Web contents 301 (including HTML and JavaScript codes). The Web engine 304 performs the rendering and provides the result of the rendering for the WebView 302 displaying the Web contents.

In step 904, the WebView 302 detects an operation in the Web contents that the WebView 302 displays. If the WebView 302 detects that the "select file" button 802 shown in FIG. 8 is pressed, the WebView 302 notifies the Web engine 304 of information of the "select file" button 802 being pressed in step 905.

In step 906, in response to the notification of the step 905, the JavaScript core 305 of the Web engine 304 executes the JavaScript code corresponding to the press of the "select file" button 802 to call a function bound to the native library 307. As a result, a function for selecting a file comprised by the native library 307 is called.

In response to the call in the step 906, the native library 307 executes a process for selecting a file in step 907. This selecting process is not described in detail here, as the process according to the present embodiment uses a known technique (Storage Access Framework: shown in FIG. 8 (805)) provided by the operating system.

A user selects a file from a folder viewable through the information processing apparatus 101. Then, in step 908, an identifier (e.g., a file path) of the file selected as a result of the process is notified from the native library 307 to the JavaScript core 305 that is bound to the native library 307. In response to the notification, the JavaScript core 305 notifies the WebView 302 of the completion of the process in step 909.

In step 910, the WebView 302 detects an operation in the Web contents displayed in the WebView 302 in a manner similar to the step 904. If the WebView 302 detects that the "preview" button 803 shown in FIG. 8 is pressed, the WebView 302 notifies the Web engine 304 that the "preview" button 803 is pressed in step 911.

In response to the notification of the "preview" button 803 being pressed in step 911, the JavaScript core 305 of the Web engine 304 executes a JavaScript code corresponding to the press of the "preview" button 803 to call a function bound to the native library 307 in step 912. As a result, a function for generating a preview image (a function provided by the "getImage" method shown in FIG. 4) comprised by the native library 307 is called.

In response to the call in the step 912, the native library 307 executes a process for generating a preview image in step 913. This process is described in detail with reference to FIG. 10 to FIG. 12.

After the process for generating a preview image, the native library 307 sends preview image data generated as a result of the generating process to the JavaScript core 305 that is bound to the native library 307 in step 914. The transmission of the preview image data is realized by the "cb_getImage" method described above.

In step 915, JavaScript core 305 stores the received preview image data in a storage (local storage) 303 of the WebView 302.

In step 916, the WebView 302 sets the preview image data stored in the local storage 303 in the "src" of the "image" tag in a preview display area of the Web contents, and displays the preview image.

In step 917, the WebView 302 detects an operation in the Web contents in a manner similar to the above step 910. If the WebView 302 detects that the "Print" button 804 shown in FIG. 8 is pressed, in step 918, the WebView 302 switches the displayed Web contents to a print setting screen described later in FIG. 13.

Figure 13:
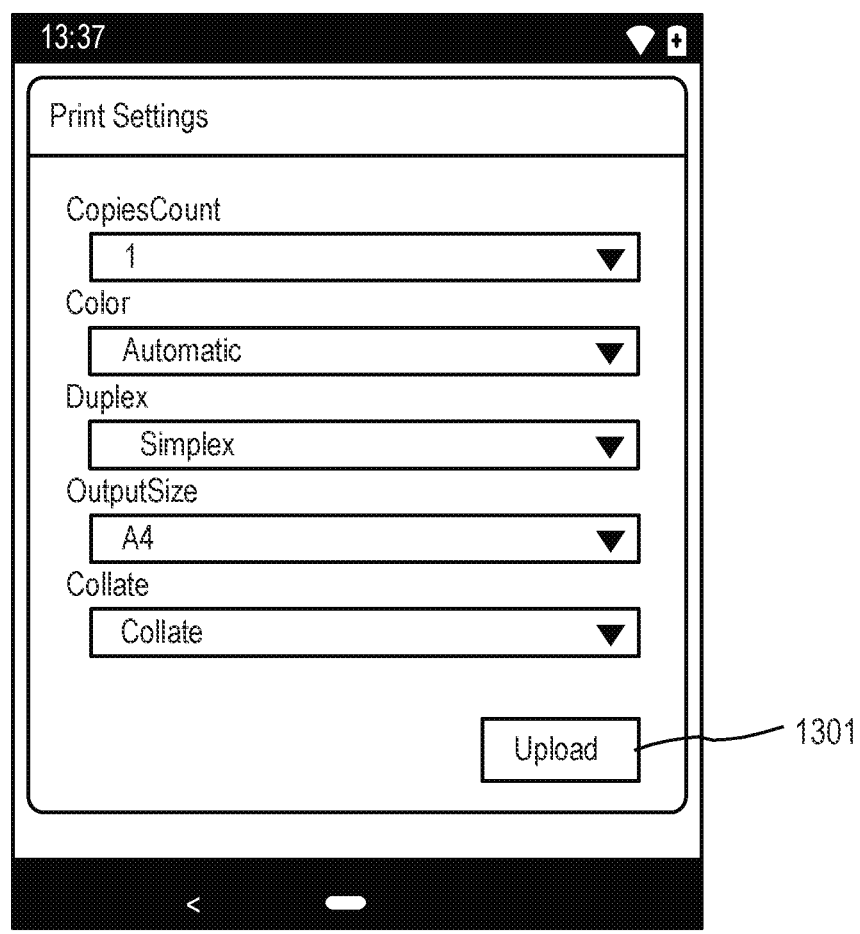
FIG. 13 shows an example of user interface (UI) for the print setting.

In step 919, the WebView 302 detects an operation in the Web contents in a manner similar to the above step 917. If the WebView 302 detects that the "Upload" (print data registration) button 1301 shown in FIG. 13 is pressed, the WebView 302 advances the process to step 920.

In step 920, the WebView 302 notifies the Web engine 304 that the "Upload" (print data registration) button 1301 is pressed. In this step, the WebView 302 also notifies the Web engine 304 a print setting data together with the file identifier (e.g., file path) received in the above step 909. The print setting data includes setting items and attribute data, and each of the setting items is linked with the corresponding attribute data that is set in each setting item.

In response to the notification of the "Upload" button 1301 being pressed, in step 921, the JavaScript core 305 of the Web engine 304 executes the corresponding JavaScript code to call a function bound to the native library 307. As a result, a function for generating a job comprised by the native library 307 is called.

In response to the call executed in the step 921, the native library 307 executes the job generating process in step 922.

After completing the job generating process in the step 922, the native library 307 executes a process for transmitting a job in step 923. More specifically, the native library 307 transmits job data generated in the above step 922 to the MFP 104 by using a data transmitting function comprised by the native library 307. The destination of the transmission (e.g., an IP address) may be preregistered to the system, or may be selected through the UI screen. The MFP 104 is described as the destination of the job data, but the destination may be a print server. The processes of steps 922, 923 are specifically described in FIG. 14.

In step 924, the MFP 104 registers the job received from the native library 307. In step 925, the MFP 104 notifies the native library 307 of a result of the job registration process as a process completion notice. In response to the notification of the above step 925, in step 926, the native library 307 notifies the WebView 302 of the completion notice via the JavaScript core 305 bound to the native library 307. As described above, the print job is registered to the MFP 104 by the steps 917 to 926.

Figure 10:
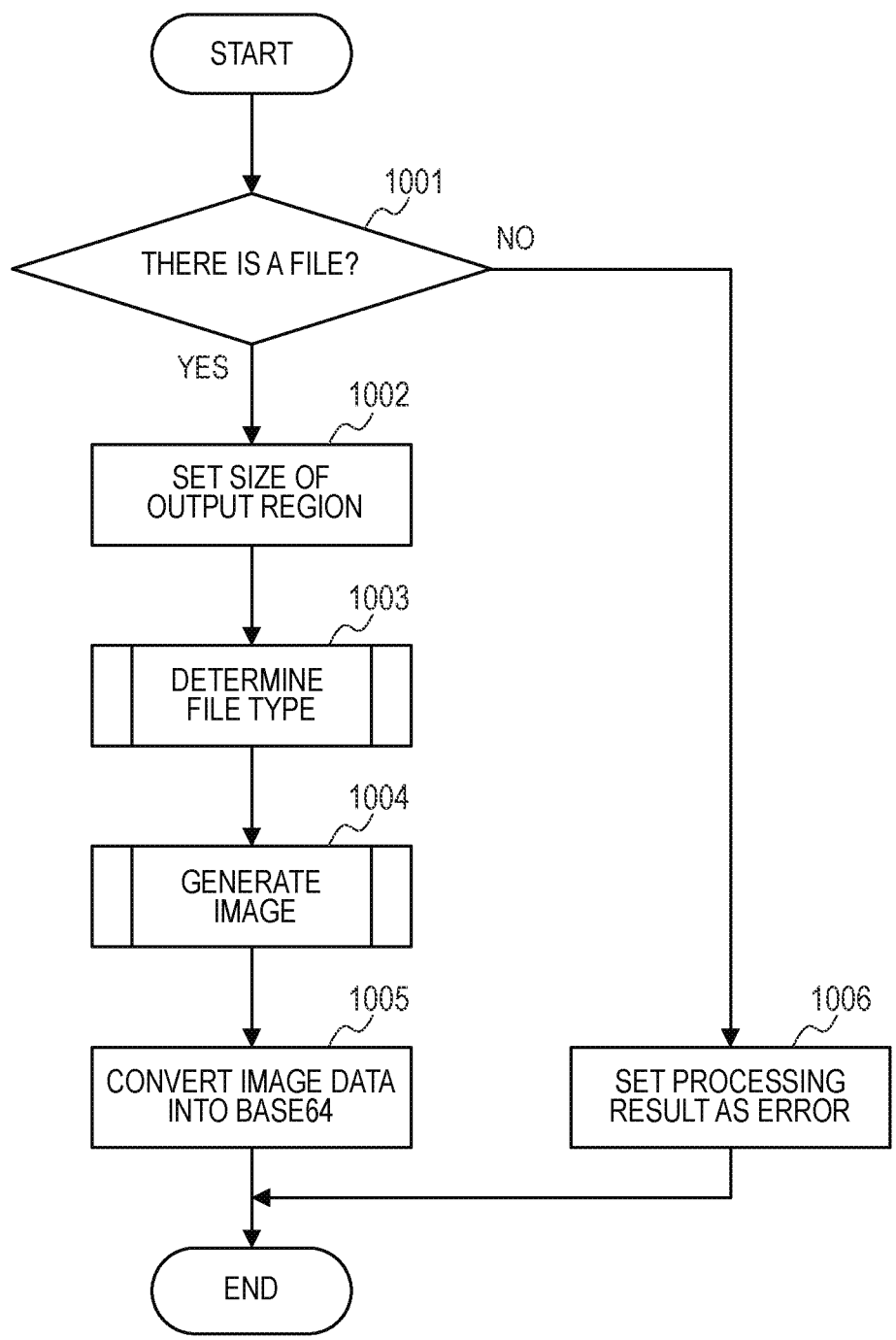
FIG. 10 is a flowchart showing specific processes for generating a preview image.

FIG. 10 is a flowchart showing specific processes executed by the native library 307 for generating a preview image in the step 913. The preview image is generated by using the file path of the image file notified in the step 912. The processes described in FIG. 10 as well as FIG. 11 and FIG. 12 (described later) are executed by the function for generating a preview image comprised by the native library 307 so that the processes described here are executed by the native library 307.

In step 1001, the native library 307 uses the file path of the image file notified in the step 912 shown in FIG. 9 to check whether there is a file. If there is no file (No in the step 1001), the native library 307 advances the process to the step 1006, determines a result of the process as an error (step 1006), and ends the process of the present flow chart.

On the other hand, if the native library 307 determines that there is a file (Yes in the step 1001), the native library 307 advances the process to the step 1002.

In step 1002, the native library 307 sets a size of output region. In the present embodiment, the size of output region is set to be substantially same as a size of a display region for a preview image displayed in the WebView 302. The native library 307 generates a preview image to fit the display region.

In step 1003, the native library 307 determines a file type of the file found in the above step 1001 to change a method of generating a preview image depending on the file type. The file type indicates a sort of file such as PDF, JPEG, or PNG. This process is further described later in FIG. 11.

In step 1004, the native library 307 generates a preview image from the image data after determining the file type. This process is further described later in FIG. 12.

In step 1005, the native library 307 converts the image data generated in the above step 1004 into Base64 strings. This is because in some cases the Web View 302 requires the image data as a string format to execute the process. After the process of the above step 1005, the native library 307 ends the process of the present flowchart.

Figure 11:
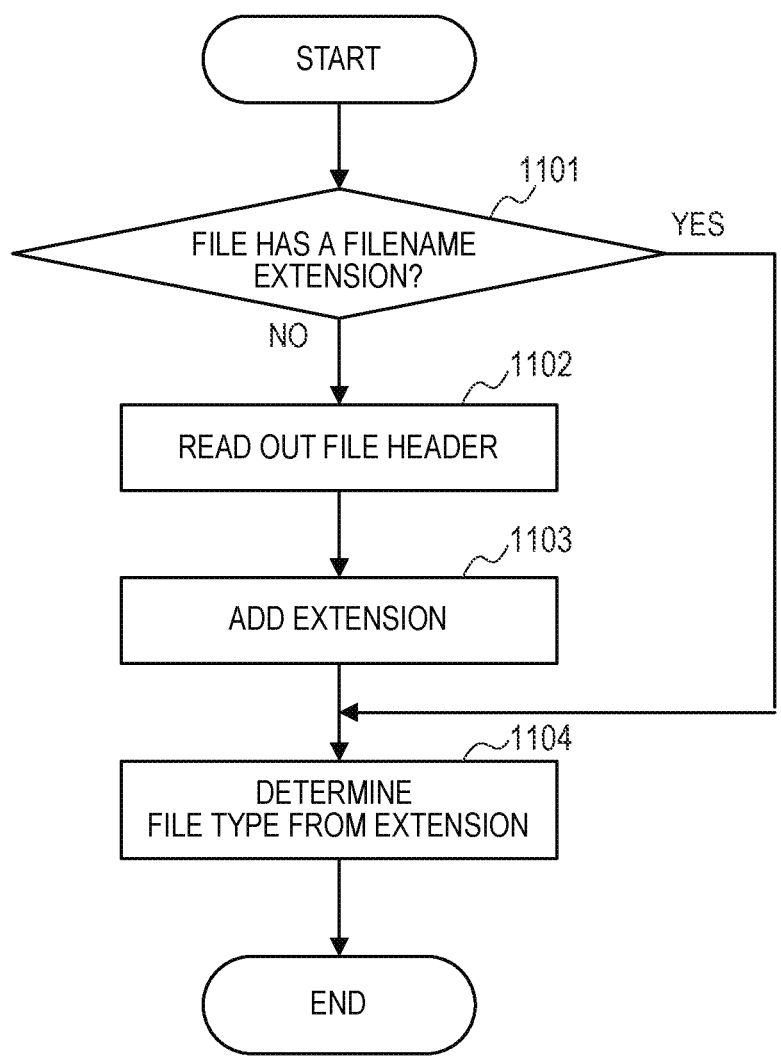
FIG. 11 is a flowchart showing specific processes for determining file types.

FIG. 11 is a flowchart showing specific processes for determining file types in the step 1003 of FIG. 10. In step 1101, the native library 307 determines whether the file has an extension such as "XXX.jpg". If the file does not have any extension (No in step 1101), the native library 307 advances the process to step 1102.

On the other hand, if the file has an extension (Yes in step 1101), the native library 307 advances the process to step 1104.

In step 1102, the native library 307 reads in information of several tens of bytes starting from the head of the file (i.e., header information) to determine the file type. For example, if an area of the read-in header information includes a file type identifier such as % PDF, the native library 307 determines that the file is a pdf file.

In step 1103, the native library 307 adds an extension corresponding to the file type determined in the above step 1102, and advances the process to step 1104.

In step 1104, the native library 307 determines a file type from the extension of the file. More specifically, the native library 307 uses data that links extensions to file types to determine the file type from the extension. For example, the native library 307 uses a table as shown in FIG. 16, and determines that the file type is "image/jpg" if the extension is "jpeg". After the determination of file type, the native library 307 ends the process of the present flowchart.

After on the determination of file type for the image data, in the step 1004 of FIG. 10, the native library 307 generates a preview image from the image data.

Figure 12:
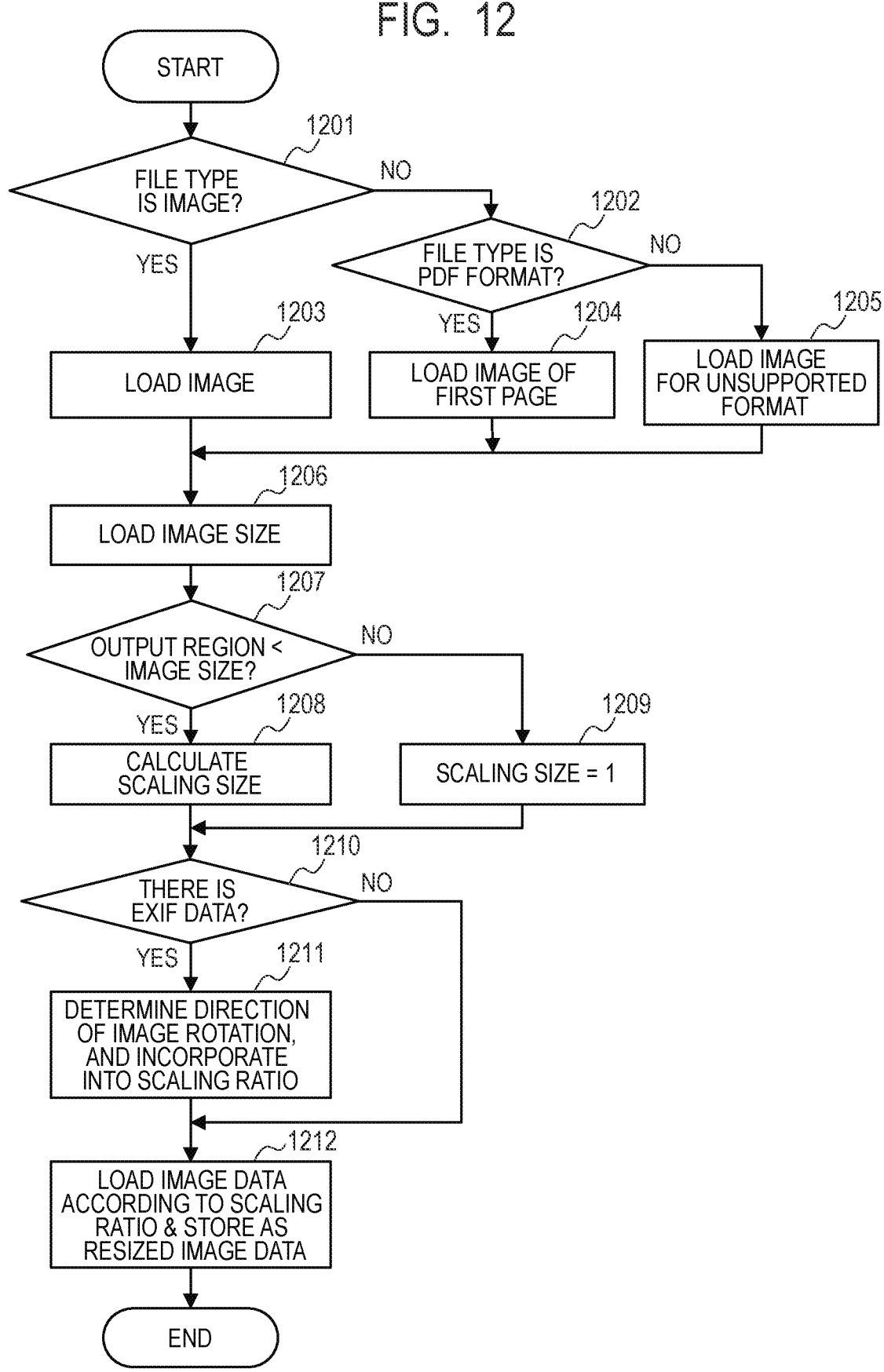
FIG. 12 is a flowchart showing specific processes for generating an image.

FIG. 12 is a flowchart showing specific processes of the step 1004 of FIG. 10 for generating an image.

In step 1201, the native library 307 checks whether the file type determined in the step 1003 of FIG. 10 is an "image" or not. For example, the native library 307 checks whether the name of the determined file type includes a string "image" or not. If the name of the file type includes the "image" (Yes in step 1201), the native library 307 advances the process to step 1203, and treats the file as an image data (single page).

In step 1203, the native library 307 reads in an image attribute of the image data (e.g., image size, image information such as Exif (Exchangeable image file format)), and advances the process to step 1206.

If the name of the determined file type does not include the "image" (No in step 1201), the native library 307 advances the process to step 1202. In step 1202, the native library 307 determines whether the name of the file type determined in the step 1003 of FIG. 10 includes a string "pdf". If the name of the file type includes the "pdf" (Yes in step 1202), the native library 307 advances the process to step 1204.

In step 1204, the native library 307 read in the image attribute (image size) and the image data corresponding to the first page of the PDF file as PDF data, and advances the process to step 1206. The PDF file may consist of multiple pages. In the above step, the native library 307 reads in the image data corresponding to the first page of the PDF file but the native library 307 may read in all of the pages.

On the other hand, if the name of the determined file type does not include the "pdf" (No in step 1202), the native library 307 determines that the file does not have predetermined file formats such as an image or PDF, and advances the process to step 1205.

In step 1205, the native library 307 determines that the file has an unsupported format, and reads in the image attribute (image size) and image data (e.g., a predetermined icon) predefined for unsupported preview formats. Then, the native library 307 advances the process to step 1206.

In the present embodiment, the file types supported for generating a preview image are the image format and PDF format. However, the supported file types may be expanded to other file types by adding the determining and reading in processes described above.

In step 1206, the native library 307 obtains the image size from the image attribute obtained in the above step 1203, 1204, or 1205.

In step 1207, the native library 307 compares the size of output region set in the step 1002 of FIG. 10 with the read-in image size obtained in the above step 1206. If the image size is greater than the size of output region (Yes in step 1207), the native library 307 advances the process to step 1208.

In step 1208, the native library 307 calculates a scaling ratio of the image. In the present step, the native library 307 calculates a scaling ratio (reduction ratio) of the image to fit the preview image within the output region. For example, let us assume that the output region has a size of 200 (width)× 200 (height) pixels, while the image has a size of 800 (width)×400 (height) pixels. In this case, the image has the width greater than the height. Thus, the scaling ratio is set to 200/800=0.25 to fit the width within the output region. The preview image to be generated has a size of 200×100 (the original pixel 400 multiplied by the scaling ratio of 0.25) pixels to maintain the aspect ratio of the image.

After completing the above step 1208, the native library 307 advances the process to step 1210.

On the other hand, if the image has a size equal to or smaller than the size of output region (No in step 1207), the native library 307 advances the process to step 1209.

In step 1209, the native library 307 sets the scaling ratio of the image to 1 (i.e., the same size), and advances the process to step 1210.

In step 1210, the native library 307 determines whether the image attribute obtained in the above step 1203, 1204, or 1205 includes information (e.g., Exif information) about the direction of image. If the image attribute includes data about the direction of image (Yes in step 1210), the native library 307 advances the process to step 1211.

In step 1211, the native library 307 calculates the rotational direction of image from the information about the direction of image. In general, images captured by a camera function of a smartphone are taken in the landscape direction. As a result, the preview images generated from the images are also stored in the landscape direction so that it may be necessary to rotate the image. Here, the native library 307 calculates the affine coefficient based on the scaling ratio obtained in the above step 1208 and the rotational direction of image. In other words, the native library 307 incorporates the rotational direction of image into the scaling ratio. The affine coefficient (or affine transformation) is not described in detail here, as it is a known technique.

After completing the above step 1211, the native library 307 advances the process to step 1212.

On the other hand, if the image attribute does not include data about the direction of image (No in step 1210), the native library 307 advances the process to step 1212.

In step 1212, the native library 307 reads in the image data in accordance with the obtained scaling ratio, stores the image data as a file, and ends the process of the present flowchart.

After completing the process shown in FIG. 10 to FIG. 12, the native library 307 sends the result of the process and the image data converted into the Base64 format to the WebView 302 through the steps 914, 915 of FIG. 9 to display the preview image.

FIG. 13 shows an example of user interface (UI) for the print setting. In this example, the UI shows options selectable for each item of the print setting.

FIG. 13 shows selectable options such as "1", "2", or "3" for a setting item "CopiesCount" (number of copies), and a user selects one of the options for the print setting. In a similar manner, the UI shows options selectable for other setting items such as "Color", "Duplex", "OutputSize", or "Collate". The user selects one of the options for the setting. The UI shown in FIG. 13 allows the user to perform the print setting by selecting an option for each setting item. If there are unselected items, it is considered that the default setting shown in the UI are selected for the unselected items. The selected print setting is stored in a form of print setting data including a group of the selected options such as "CopiesCount: 1", "Color: Automatic", etc. . . . .

FIG. 14 is a flowchart showing specific processes for transmitting a job executed by the native library 307 in the steps 922, 923 of FIG. 9. The processes shown in FIG. 14 are executed by a function of transmitting data comprised by the native library 307.

In step 1401, the native library 307 monitors the process in the step 921 of FIG. 9, i.e., calling the function for generating a job (data reception standby process). If the calling is detected, the native library 307 advances the process to step 1402.

In step 1402, the native library 307 converts the print setting data received in the step 921 into a job ticket interpretable by a printer. For example, the native library 307 may convert the print setting data into a JDF (Job Definition Format), but the format is not limited to the JDF so that the native library 307 may convert the print setting data into any job ticket that a printer can interpret. Recently, the JDF is employed to various printers, and has substantially become the standard format of the printing industry. The JDF can include operating information about the entire printing process.

FIG. 15 shows an example of job ticket described in the JDF.

For example, in the above step 1402, the native library 307 may fill a template of a job ticket described in the prepared JDF with the received print setting. More specifically, if a number of copies is one, the native library 307 sets "1" in a portion of "Amount=" shown in FIG. 15 that corresponds to an item for setting a number of copies in the JDF. Similarly for other setting items, the native library 307 sets, for example, "OneSided" for the single surface printing or "TwoSided" for the double surface printing in a portion of "Sides=" to generate a job ticket.

In step 1403, the native library 307 checks whether there is print image data. More specifically, the native library 307 checks the file identifier (file path) obtained in the steps 920, 921 of FIG. 9 to determine if there is print image data. If there is no print image data (No in step 1403), the native library 307 ends the process of the present flowchart.

On the other hand, if there is print image data (Yes in step 1403), the native library 307 advances the process to step 1404.

In step 1404, the native library 307 reads in the print image data checked in the above step 1404.

In step 1405, the native library 307 packages the print setting data and the print image data as a single file to generate a print job. More specifically, the native library 307 packages the print setting data (JDF) and the print image data (converted into Base64 strings) as a single file with a MIME format to generate a print job. The generation of a print job with the MIME format is not described in detail, as it is a known technique and also described in the specification of the JDF.

In step 1406 (corresponding to the step 923 of FIG. 9), the native library 307 transmits the print job generated in the above step 1405 to the MFP 104 by using a protocol such as the http protocol. After completing the transmission of the print job, a response is sent back from the MFP 104.

In step 1407, the native library 307 receives the response and a result of the process, and ends the process of the present flowchart.

The native library 307 sends a result of the process executed in the above step 1407 or an error notice due to lacking the print image data in the step 1403 to the WebView 302 as a process completion notice (see the step 926 of FIG. 9).

As shown above, according to the present embodiment, the JavaScript core 305 calls a function for generating a preview image implemented in the native library 307 when displaying the preview of a file displayed in the WebView 302. The native library 307 generates preview image data, and converts the preview image data into Base64 strings. After completing the preview image generating process, the native library 307 sends the preview image data to the JavaScript core 305 that is bound to the native library 307. The preview image data received by the JavaScript core 305 is stored in the local storage 303 of the WebView 302. Then, the preview image data stored in the local storage 303 is set to the "src" of the "Image" tag of a preview display area in the Web contents so that the WebView 302 can display the preview image data. That is to say, the JavaScript core 305 calls a function for generating a preview image implemented in the native library 307 for displaying a preview image of a file displayed in the WebView 302 without exchanging image data with the server 102. The above configuration of the present embodiment allows an information processing apparatus to display a preview image without exchanging image data with a server, which provides an advantage such that the process can be executed without delay due to the negative influences by the network traffic depending on network environments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2020-129210, filed Jul. 30, 2020, which is hereby incorporated by reference herein in its entirety.

What is claimed is:

1. An information processing apparatus comprising:
   at least one memory that stores instructions, a native library, and one or more files; and
   at least one processor that executes the instructions to perform:
      obtaining a web content from a server;
      displaying an operation screen in a display, the operation screen generated by instructing a WebView to process the obtained web content;
      if a predetermined instruction is given through the operation screen, calling the native library by using a script contained in the obtained web content, and instructing the called native library to generate image data corresponding to a file that is selected from the stored one or more files by a user, wherein the selected file is different from the obtained web content; and
      displaying the image data generated by the called native library in the operation screen.

2. The information processing apparatus according to claim 1, wherein the image data generated by the called native library is a preview image of the selected file.

3. The information processing apparatus according to claim 1, wherein, if the selected file does not have a predetermined format, the called native library generates, as the image data corresponding to the selected file, image data indicating that the stored file does not have a supported format.

4. The information processing apparatus according to claim 1, wherein, if the selected file consists of multiple pages, the called native library generates, as the image data corresponding to the selected file, image data based on a first page of the multiple pages.

5. The information processing apparatus according to claim 4, wherein the selected file consisting of multiple pages has a PDF format.

6. The information processing apparatus according to claim 1, wherein the called native library is a program provided by an operating system of the information processing apparatus, and/or a shared library preinstalled in the information processing apparatus.

7. An information processing method executed by an information processing apparatus, the method comprising:
   obtaining a web content from a server;
   displaying an operation screen in a display of the information processing apparatus, the operation screen generated by instructing a WebView to process the obtained web content;
   if a predetermined instruction is given through the operation screen, calling a native library from the information processing apparatus by using a script contained in the web content, and instructing the called native library to generate image data corresponding to a file that is selected from one or more files stored in the information processing apparatus by a user, wherein the selected file is different from the obtained web content; and
   displaying the image data generated by the called native library in the operation screen.

8. A non-transitory computer readable storage medium storing a program for causing a processor to perform:
   obtaining a web content from a server;
   displaying an operation screen in a display of an information processing apparatus, the operation screen generated by instructing a WebView to process the obtained web content;
   if a predetermined instruction is given through the operation screen, calling a native library from the information processing apparatus by using a script contained in the web content, and instructing the called native library to generate image data corresponding to a file that is selected from one or more files stored in the information processing apparatus by a user, wherein the selected file is different from the obtained web content; and
   displaying the image data generated by the called native library in the operation screen.

* * * * *